April 4, 1967  F. A. AXELSONN  3,311,948
PANEL FORMING APPARATUS

Filed Sept. 20, 1963  4 Sheets-Sheet 1

INVENTOR.
FOLKE A. AXELSONN
BY
ATTORNEYS

April 4, 1967  F. A. AXELSONN  3,311,948
PANEL FORMING APPARATUS
Filed Sept. 20, 1963  4 Sheets-Sheet 2

INVENTOR.
FOLKE A. AXELSONN
BY
ATTORNEYS

INVENTOR.
FOLKE A. AXELSONN
BY
ATTORNEYS

April 4, 1967 F. A. AXELSONN 3,311,948
PANEL FORMING APPARATUS
Filed Sept. 20, 1963 4 Sheets-Sheet 4

INVENTOR.
FOLKE A. AXELSONN
BY
*Price & Heneveld*
ATTORNEYS

United States Patent Office 3,311,948
Patented Apr. 4, 1967

3,311,948
PANEL FORMING APPARATUS
Folke A. Axelsonn, Grand Haven, Mich., assignor to Airspace, Inc., Fruitport, Mich., a corporation of Michigan
Filed Sept. 20, 1963, Ser. No. 310,370
8 Claims. (Cl. 18—4)

This invention relates to molding apparatus, and more particularly to handling apparatus for laminated panels having an expanded foam plastic core.

Since foamed materials of plastics exhibit excellent thermal insulation qualities, such materials possess excellent potential as a fill in structural walls, panels and the like. Consequently, it is known to foam in situ plastic foam between walls for insulation. This procedure employs low pressure foaming materials and methods resulting in a relatively high density material, usually in the range of about five pounds per cubic foot.

It has been determined, however, that high pressure foaming between sheets of material such as metal, plywood, Formica, Micarta or the like produces a resulting sandwich having a desirable low density and a superior structural strength. Low density means better insulation and less material cost. The sheet material enclosing the laminated panel need only be thin, and can actually be highly flexible before lamination. The resulting laminated panel from these sheets and a stiff foam has excellent rigidity as well as high thermal insulating qualities. The high pressure foam also exhibits tight and lasting adherence to the overlying sheet materials.

However, to fabricate preformed high pressure, foamed, core sandwiches on an economical mass production basis has heretofore, as far as is known, never been achieved to the extent of making such sandwiches practical for use as ordinary wall paneling. Consequently, these could not be economically provided for prefabricated housing, animal housing, mobile homes and so forth. One reason for this is because of difficulties involved with the large initial pressure during chemical reaction exerted by the high pressure foaming material, and the subsequent lesser but still substantial pressures which vary from the initial start of reaction to the final stages of curing. These factors result in the difficulty of maintaining the desired product configuration and dimensional tolerances while the structure is undergoing the high internal pressures. This has presented a very substantial problem heretofore from a production standpoint.

Methods suggested to overcome it include the use of a large high pressure molding press to retain the entire structure during both the reaction period and also the curing period. This is often about one-half to three-quarters of an hour. At this slow rate of production however, and due to the tie-up of the expensive pressure equipment, the overall economics of fabrication are so poor that the foam panels cannot begin to compete with those of competitive materials.

It is therefore an object of this invention to provide an economical injection molding apparatus for forming high-pressure foam-core laminated sandwiches.

It is another object of this invention to provide apparatus of forming laminated, high pressure, foam core, panel-type sandwiches capable of mass production in a highly efficient, competitive and economical manner.

It is still another object of this invention to provide apparatus for forming foam core panel type sandwiches, using high pressure foam injection molding, retaining the dimensional tolerances and desired configuration of the article, yet to do so in a manner allowing the formation of panels repeatedly on a rapid production basis.

Another object of this invention is to provide apparatus capable of accommodating high pressure injection molding for foam core products in a unique two-stage pressure retention means.

Another object of this invention is to provide a conveyorized production line apparatus capable of handling foam core molded products with sufficient force to counteract high internal reaction pressures, yet enabling the curing products exerting lesser but still high pressures to be moved along the conveyor for mass production.

These and several other objects of this invention will become apparent upon studying the following specification in conjunction with the drawings in which.

Figure 1:
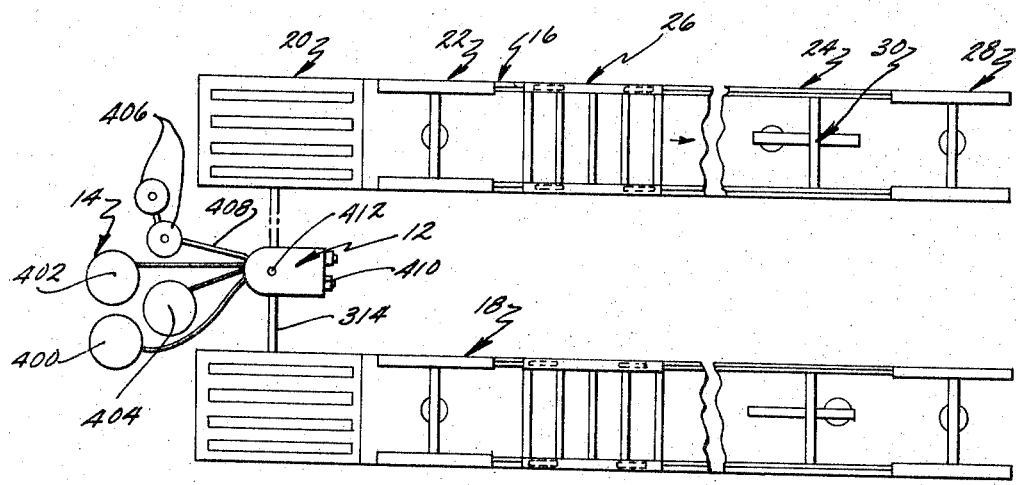
FIG. 1 is a plan diagrammatic view of the novel apparatus arranged in a pair of production lines.

Referring now specifically to the drawings, the apparatus as illustrated in FIG. 1 includes a common injector head 12, chemical reactant pressure vessels 14 (illustrated diagrammatically), and a plurality, here two, high pressure molding production lines 16 and 18.

Figure 2:
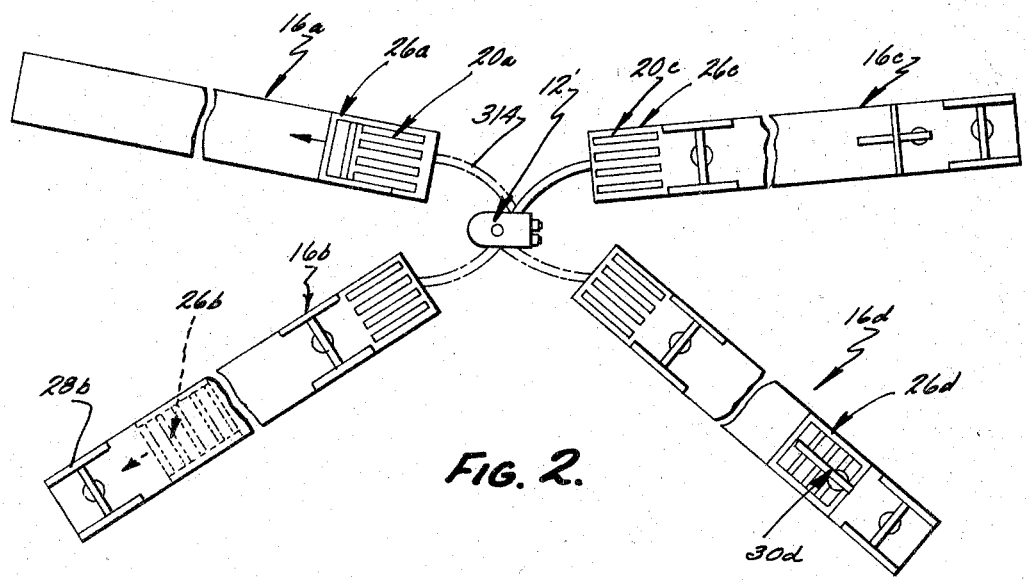
FIG. 2 is a plan diagrammatic view of the novel apparatus of a plurality of lines arranged in generally radial fashion around a common injection head.

In FIG. 2, the injection head 12' accommodates a plurality of generally radially oriented production lines 16a, 16b, 16c and 16d. These are representative of the multiple line-single injection head combination used to advantage with the invention. Such arrangement is more specifically set forth in pending United States patent application entitled Injection Foam Molding System filed Sept. 20, 1963, Ser. No. 310,210 and now U.S. Patent No. 3,203,042, and assigned to the assignee herein.

The apparatus illustrated is for the high pressure formation of panel-type laminated sandwiches having a low density, foamed plastic core of relatively rigid foam plastic, and a pair of overlying sheet elements. The sheets may be of sheet metal such as steel, aluminum (or etched stainless steel), or of Formica, Masonite, or other suitable metallic materials, pressed fibrous materials or synthetics. The particular sheet material is not critical.

The completed laminates are normally of a thickness of one to three inches, for example, and may be rectangular in cross section and generally flat, or alternatively formed to particular curvatures and configurations. For purposes of convenience the inventive apparatus will be described with respect to a rectangular panel which is flat. The average such panel is several feet in width, e.g. about four feet and several feet in length, e.g. about eight feet.

These, of course, are only representative dimensions and configuration features for illustrative purposes.

Each of the production lines of the plurality normally employed comprises an elongated conveyorized line including several distinct portions. Each comprises a stationary, pressure restraining or retaining means 20, an adjacent elevator 22, an elongated conveyor 24 including two sets of conveyor tracks one above the other, and adapted to convey the movable mold retaining cars 26, a second elevator 28 at the opposite end of the line, and a supplemental hoist 30 for disassembling and reassembling the restraining means and mold of the mold cars.

Each of these conveyor lines supports several of the cars 26. For purposes of convenience, only one car is shown in detail in FIG. 1. The mobile cars 26 move along the tracks into and out of restraining means 20 on the upper and lower tracks.

Relatively high speed production is achieved. This is due to several features, and especially to two particular features of the combination. The first is the two stage restraining means for the mold, with the car itself forming a mobile restraining means for the curing article in the mold, and the stationary restraining means 20 being a reinforcing, temporary retainer for the individual cars during the initial chemical reaction of the foaming plastic. The second is the conveyor system which extends directly into the stationary restraining means 20 and enables the individual mobile restraining means or cars to move into and out of the temporary restraining means for initial reaction therein and subsequent curing on other portions of the conveyor. These concepts will be understood more fully from the detailed description to follow.

Each of the individual cars 26 includes a base 40 (FIG. 6 and FIG. 3), and an attached pressure cover hold-down element 42 held in a spaced relationship from base 40 by a plurality of upright spacers 44 on opposite sides of the car. The hold-down is clamped tightly to the base against these spacers in this particular spaced relationship by clamping means. The clamping means as shown comprises a plurality of flanges on opposite sides of cover 42, a plurality of flanges 48 on the opposite sides of base 40, and threaded tie bars 50 (FIG. 3) extending therebetween. The tie bars may be studs employing cooperative nuts.

Both the bed and the pressure cover of this restraining means are basically rectangular frames formed of metal stock such as steel. The periphery of the construction is interconnected by weldment to a plurality of parallel, spaced steel ribs 54. The base and cover are both rigid and sturdy, so that when clamped together on the edges, are capable of retaining the intermediate mold assembly against pressures of up to about 30,000 p.s.i.

The bed of each car is covered by an element 58 forming a continuous surface. Typically it is a plywood sheet of substantial thickness forming a continuous bed surface for the mold. It is preferably coated with an aluminum sheet for optimum release. The lateral sides of the mold are defined by a pair of uprights such as angle irons 60 and 62 (FIG. 6) secured to mold board 58. The mold also includes front and back fixed bar elements 66 and 68. The four upright surfaces therefore define an elongated chamber therebetween. Preferably a removable bar 70 is spaced from fixed bar 68 by a plurality of short horizontal spacer blocks on tubes 72 for easier disassembly of the mold.

To achieve simplified assembly and disassembly, and to provide an offset on one side of the molded article, one side of the mold includes an elongated rod 76 of rectangular cross section extending along the inner face of angle iron 62. A stepped plate 78 is abutted against and fits over the bar in the mold. The other side includes a pair of angle bars 80 and 82, the specific function of which will be described hereinafter. All of these insert elements are especially suited to the particular edge construction of the panel illustrated. These may be modified, eliminated, or supplemented to achieve other panel edge configurations or junctures.

The mold is enclosed on the top by a second mold board 86, ordinarily of plywood of a substantial thickness. Thus the two mold boards 58 and 86, and the peripheral elements 60, 70, 62 and 66 define a generally rectangular, substantially flat chamber a few inches in height and several square feet in area for molding.

Normally the upper mold board 86 is loosely suspended from the upper or cover restraining frame 42 as by a pair of chains 90 on the forward and rearward ends. This enables hoisting of the upper mold board with the restraining cover 42 for disassembly and reassembly with maximum ease and speed.

The upper restraining element 42 includes a generally inverted U-shaped hoist bracket 98 on the top for cooperation with the hook 100 of a conventional hoist 102. This hoist may be mounted on a suitable I beam track 104 which extends longitudinally of the conveyor. The track is mounted to overhead support 106 which, being of inverted U-shaped configuration, includes a cross beam and a pair of spaced support legs extending downwardly on opposite sides of the production line conveyor.

Figure 3:
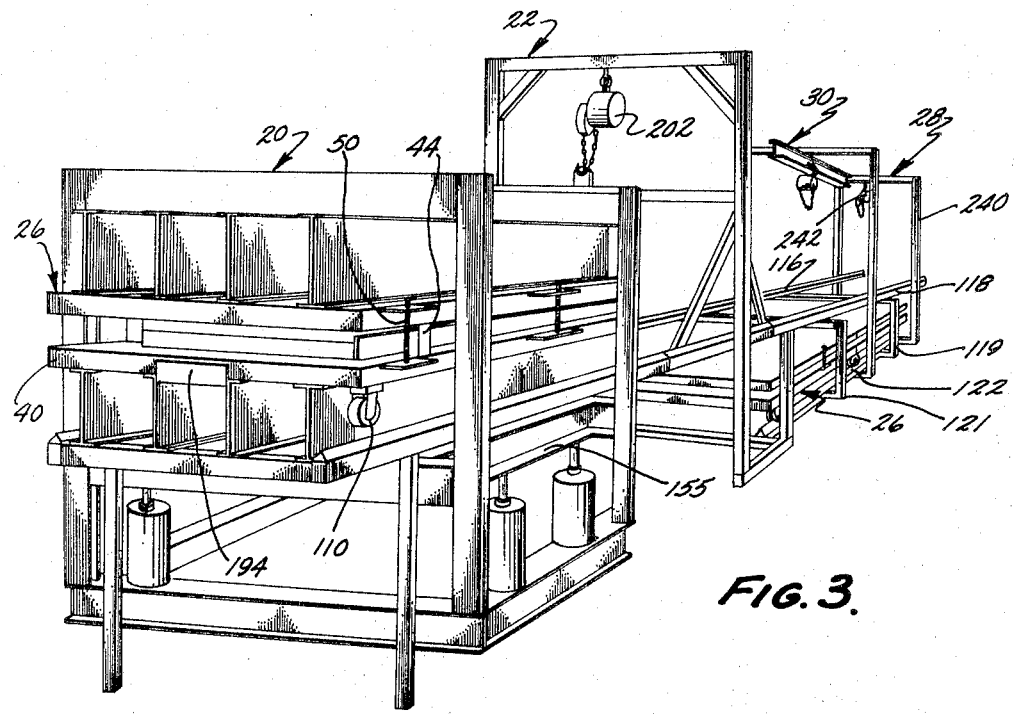
FIG. 3 is a perspective view of one of the production line setups of the apparatus.
Figure 5:
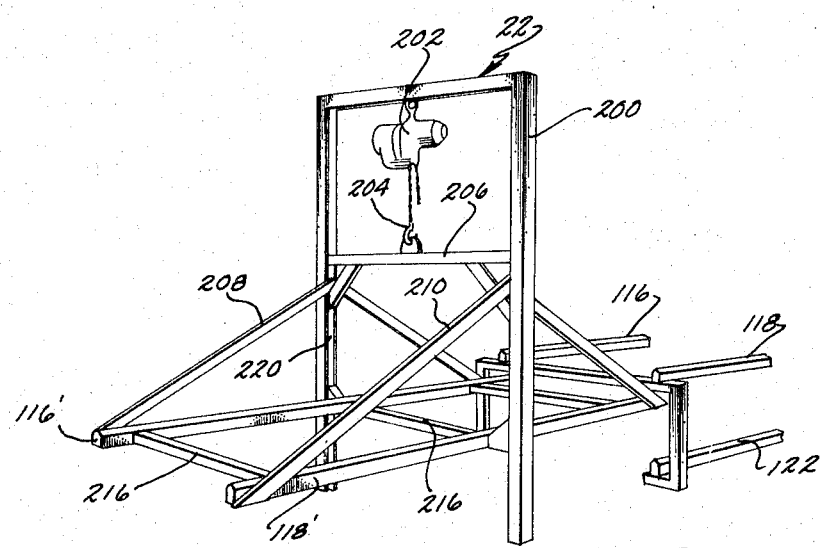
FIG. 5 is a fragmentary perspective view of an elevator in the novel apparatus.

The bed of the restraining car has a plurality of at least four depending roller wheels 110 mounted fore and aft on brackets 112 to the bottom and side edges of the car. These rollers are configured with a peripheral groove to interfit with the pair of upper tracks 116 and 118 or with the pair of lower tracks 120 and 122 (FIGS. 3 and 5).

The stationary restraining means 20 includes a fixed upper frame and a vertically shiftable lower frame. Each of these frames in essence comprises a jaw of a vertical restraining means. The upper jaw is formed by a series of spaced, adjacent, elongated, parallel, I-beams 140 welded to and suspended from a pair of overhead, generally inverted, U-shaped mounts 142 and 144. These mounts are supported on suitable interconnected I-beams or the equivalent 146 attached to the floor. The lower jaw of this restraining means likewise is formed of a plurality of spaced, parallel I-beams 150. These are attached to a pair of spaced underlying transverse supports 152 and 154. These are interconnected by cross ties 155.

The ends of these transverse supports interfit in the vertical slots 156 (FIG. 9) of the I-beams forming the vertical legs of supports 142 and 144. The opposite ends of transverse beams 152 and 154 are therefore guided during vertical reciprocal movement. Mounted under each of these beams 152 and 154 is a pair of fluid cylinders. Thus, fluid cylinders 160 and 162 hoist and lower beam 152, while cylinders 164 and another (not shown) simultaneously hoist beam 154. These move the upper surface of I-beams 150 (forming the lower jaw) to positions above and below the level of the conveyor tracks extending into the restraining means. Only one set (here the upper set) of conveyor tracks 116 and 118 extend into the restraining means between the two jaws.

The upward movement of the lower jaw is limited by spacers 170 (FIG. 9) placed in the channels of the I-beam vertical support legs. These upper ends abut the cross members of support 142 or 144, and the lower ends abut beams 152 and 154. For these reasons, initial compression applied to the movable restraining car and its mold is just sufficient to force the elements into tight engagement and to grip the car. The cylinders provide a reaction force against any tendency of the car to expand under pressure of the reacting chemicals during foaming. Consequently, it will be seen that the compression restraining means, in both its stages, provides reaction pressure or restraint against any tendency of the mold to expand. This is true of the car because of spacers 44 (FIGS. 3, 6 and 7) which enable the upper and lower car restraining elements to grip the mold but not compress it excessively, and is true with respect to this fixed or stationary restraining means 20 because of the plurality of spacers 170.

The ends of tracks 116 and 118 may be suitably vertically supported by legs 190 as necessary, and may be interconnected by a cross piece 192. The remainder of the upper tracks 116 and 118 is mounted upon and supported by a plurality of spaced brackets 119 and 121. The lower tracks are also affixed to these brackets to maintain their parallel aligned relationship. Also, a suitable car stop 194 is provided on the lower bed of the stationary restraining means to prevent a car being wheeled into the restraining means from going too far.

The hydraulic cylinders 160 and 162 are capable of restraining large forces such as pressures of 80,000 p.s.i. on a panel several square feet in area. Conceivably the cylinders may be substituted by equivalent mechanical restraining means capable of being moved from a lowered condition to an elevated position adjacent the car. Also, within the broader aspects of this invention, the upper jaw may move instead of the lower jaw. However, it is preferable to shift the lower jaw upwardly since this elevates the car above its track, thereby removing the wheels from the track as illustrated in FIG. 3. This eliminates the possibility of the application of pressure between the wheels and tracks. Thus, the upper surfaces of the lower I-beams 150 are purposely shifted from a position below these tracks, to a position above the tracks in the restraining condition.

In the preferred form of the apparatus, a track type elevator (see FIG. 5) 22 is located adjacent the stationary restraining means and in alignment with the conveyor tracks between the jaws. This elevator includes an overhead, inverted, generally U-shaped support 200 anchored on its lower ends. Its cross beam extends across and above the elevator tracks. Mounted beneath and to this cross beam is a conventional power hoist 202. To the hook 204 of the hoist is attached a cross beam 206. Suspended from this beam are two pairs of spaced diagonal supports 208 and 210. To the ends of these diagonal supports are mounted elevator track sections 116′ and 118′. These track sections, when raised, form a part of the upper tracks 116 and 118, and when lowered, form a part of the lower tracks 120 and 122. The track sections are suitably interconnected by cross braces 216 to retain their alignment with these upper and lower tracks. Vertical supports 220 extending from beam 206 down to track sections 116′ and 118′ are interfitted in the grooves of the I-beams forming the vertical legs of the U-shaped support 200. Thus the elevator is guided vertically during its lowering and raising.

A second elevator 28 also like elevator 22 illustrated in FIG. 5, is provided at the opposite end of the conveyor line. The elevator 28 thus includes an inverted generally U-shaped overhead support 240, a hoist 242 suspended therefrom (FIG. 3) and track sections like those illustrated in FIG. 5.

Adjacent the second elevator 28 is an unloading and reassembly station 30. This station (FIG. 6) as described previously, includes support 106, hoist track 104, and hoist 102, to disassemble and reassemble the components of the mobile cars.

Figure 6:
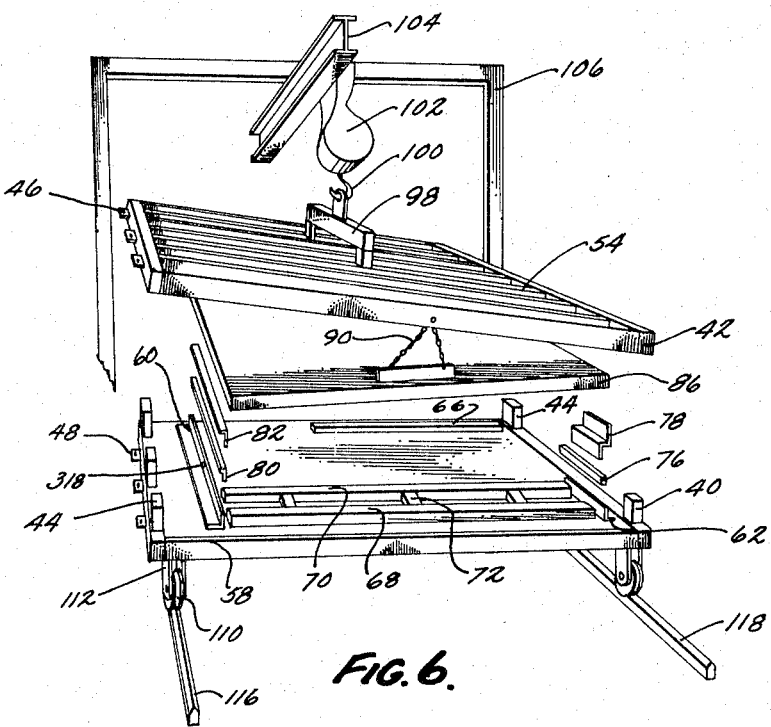
FIG. 6 is a perspective exploded view of one of the mold assemblies on a conveyorized car.
Figure 7:
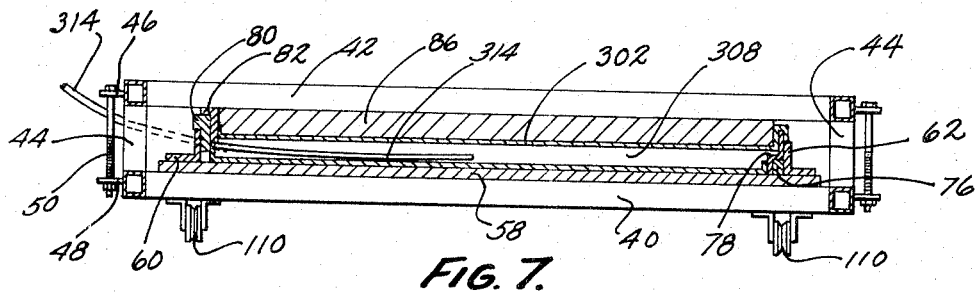
FIG. 7 is a sectional view of the assembled mold on the car illustrated in FIG. 6.

When each of the mold cars is assembled, it assumes the form illustrated in FIG. 7. The restraining base 40 on wheels 110 has attached thereto, vertically spaced thereabove, the upper pressure retainer cover 42. As explained previously, these are spaced by upright spacers 44 at the opposite sides of the elements and secured together by tie bolts 50 extending between flanges 46 and 48. Supported on and attached to the cross ribs of bottom 40 is the mold board 58. Attached to this mold board are the side angle irons 60 and 62 as well as end elements 66 and 68 (FIG. 6). The lower sheet metal or equivalent layer 300 forming the bottom of the finished panel is supported on this mold board 58, and retained within the confines of the mold assembly against bar 76 and offset Z-shaped element 78 on one side, and against inverted, L-shaped elements 80 and 82 on the opposite side. The ends of the panel are retained between fixed bar 66 and removable bar 70. The upper layer 302 which forms the opposite skin of the completed panel (FIG. 8) 310 is held in a spaced parallel relationship to bottom layer 300. Its hooked flange 306 which is turned downwardly hooks over the upwardly extending plate 78. It also rests upon end members 66 and 70. Its opposite side from flange 306 is abutted against plate 82. The top mold board 86 rests upon this upper layer. The completed assembly is not compressed excessively, but is merely retained in tightly engaged, sealed relationship to define an internal cavity 308 into which foam 312 (FIG. 8) is later injected. It is injected with a flexible tube 314 (FIGS. 7 and 4) which extends into opening 318 (FIG. 6) in the side of each mold assembly to communicate with chamber 308.

*Operation*

Figure 8:
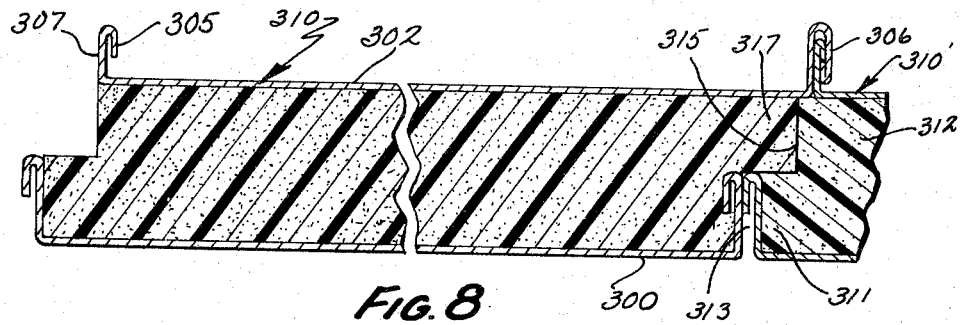
FIG. 8 is a sectional view of the completed foam core, laminated product formed with this apparatus.

To achieve the high pressure, low density, stiff foam panel illustrated in FIG. 8, having a low density, the following sequence is performed.

When the complete apparatus has been set up, a plurality of the mold cars is used on each conveyor line. To begin the process the first mold car is assembled at station 30 on upper tracks 116 and 118. Each includes the elements illustrated in exploded form in FIG. 6 in the manner illustrated in the assembled form in FIG. 7. Bar 76 is abutted against the inside face of angle iron 62, and offset plate 78 is rested upon and abutted against this bar so that its upper flange extends upwardly above angle iron 62. Then inverted L-shaped bar 80 is positioned against and on top of L-shaped bracket 60 on the opposite side of the mold. The lower sheet metal 300 is then inserted inside the mold to rest upon the bottom mold board 58. It abuts against plate 78 on one side, and the L-shaped bracket 80 on the opposite side. Then the second L-shaped bracket 82 is inserted so that its lower end abuts and holds down the upwardly projecting flange on lower layer 300. The upper article sheet is then mounted so that its downwardly turned flange 306 fits over the top edge of element 78, and the opposite side abuts against L-shaped bracket 82. Then the top mold board 86 is lowered, along with top frame 42 of the mobile restraining means. Tie bolts 50 are then tightened between the mounting flanges on the sides to cause upper frame element 42 to be tightly held down on spacers 44. The unit is then ready for movement down the conveyor tracks 116 and 118 across the elevated conveyor track sections 116′ and 118′ of elevator 22, and into temporary restraining means 20.

Figure 4:
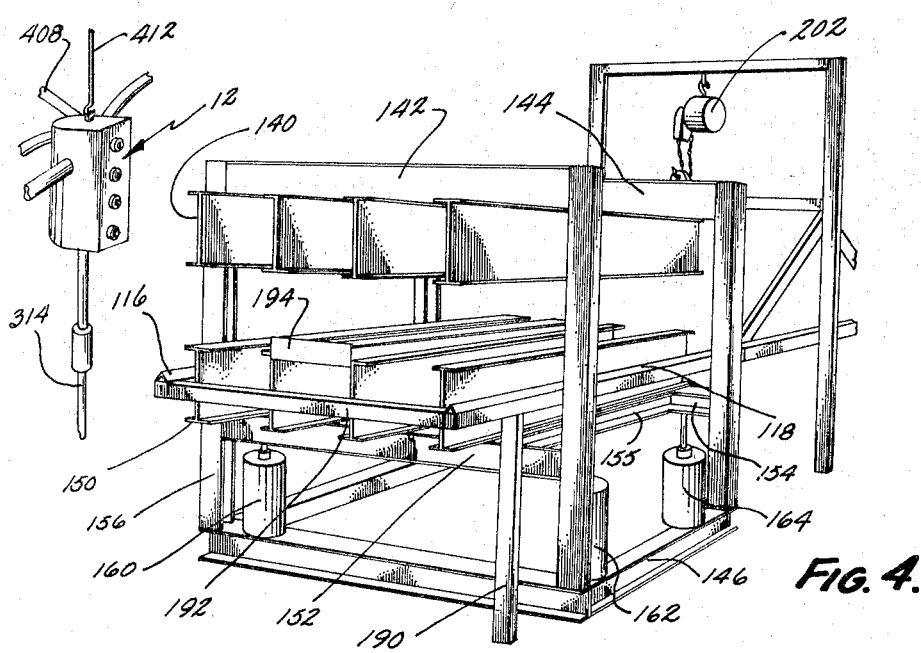
FIG. 4 is a perspective view of the stationary pressure retention zone of the apparatus.
Figure 9:
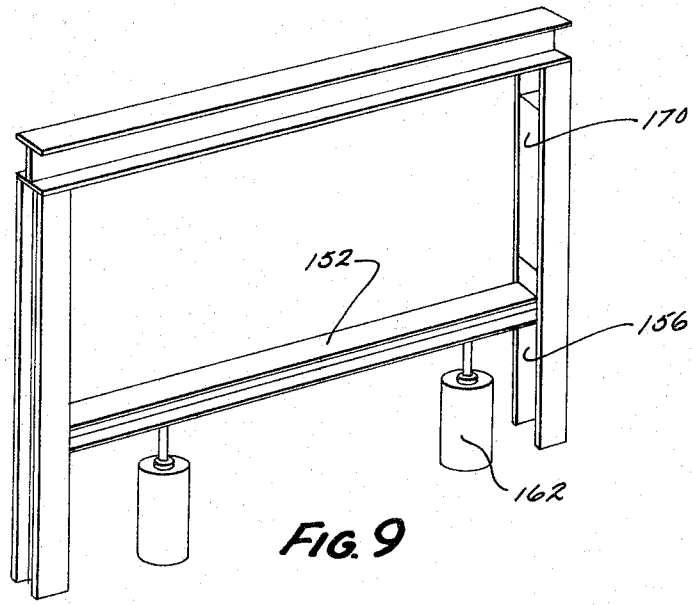
FIG. 9 is a fragmentary sectional view of one end of the stationary retention means of the press.

As the car moves into the confines of the restraining means, the lower jaw must be in a lowered condition so as not to interfere with the entry of the car. The car moves in until it abuts stop flange 194 (FIG. 4). Then cylinders 160, 162 and 164 or their equivalent, are actuated to elevate the lower jaw of the restraining means and hoist the car and mold off the conveyor tracks as illustrated in FIG. 3. When the mechanism has been hoisted sufficiently to abut the top of the car against I-beams 140, spacer elements 170 abut suports 142 and 144 and beams 152 and 154 (FIGS. 9 and 4). The unit is now ready to be injection molded.

The individual chemical reagents for forming the selected foam plastic are retained in suitable pressure vessels 14. Thus, when using an expanded polyurethane foam in the panel, the different reagents are mixed first prior to injection. Vessels 400, 402, and 404 can contain a polyether resin, an isocyanate, and a catalyst, for example, and the pressurized gaseous expanding agent, such as Freon, is maintained in the pressure tanks 406 for mechanical expansion of the foam. These are all simultaneously injected in the necessary quantity relationships through flexible hoses 408 into the mixing and injector head 12. This mixing equipment is standard and can be obtained from manufacturers such as the Admiral Equipment Company. The particular chemical reagents utilized will vary with the desired foam plastic employed. These particular ingredients, and the equipment to form them, do not form part of this invention. Such equipment is available and well known to those in this field.

The head itself is controlled by suitable switching equipment 410 on a face thereof. The head itself is suspended on element 412 from a suitable overhead support so that it can be pivoted about and shifted slightly from place to place.

Since the mixing ejection head is suspended adjacent the stationary restraining means of the several production lines 16 and 18 in FIG. 1 or 16a, 16b, 16c, and 16d in FIG. 2, it can be utilized to accommodate them successively.

A flexible hose 314 is attached to and extends out of the bottom of the ejection head to carry the mixed, but as yet unreacted chemical reagents to the mold. This hose is inserted through an opening in the side of each mold, as illustrated in FIG. 7, so that, when the ejection head is actuated the mixed unreacted reagents are injected into molding space 308 (FIG. 7). The hose is flexed in an arc inside the mold to obtain even distribution.

An initial time lag is caused by delayed reaction of the chemical reagents to enable injection before significant pressure reaction. This is achieved in well known fashion either by controlling the temperature of one or more of the reagents, or by the selection or reagents, or both.

As the chemical reagents initially react and expand, extremely high internal pressures are created with any high pressure foaming. For example, with high pressure polyurethane foaming pressures in the neighborhood of 80,000 p.s.i. are experienced. The double restraining means of the mobile car restraining means and the stationary restraining means are sufficient to prevent expansion of the mold past outside of its initial confines. Consequently, close dimensional tolerances are maintained in spite of these extremely high pressures. After the first few minutes of reaction, for example about four minutes when reacting a rigid polyurethane foam, the initial reacting and expansion pressures in the neighborhood of 80,00 p.s.i. decrease to significantly lower values around 30,000 p.s.i. During the next half hour or so, the pressures slowly subside as the foam cures to a rigid self-sustaining state.

Consequently, the stationary restraining means is purposely expanded and opened after the first few minutes to allow the car to be removed. The structure of the car itself and more specifically its restraining means, maintains the panel in its dimensionally accurate tolerances during the lower pressure curing portion of the cycle.

The car is then pushed out onto track sections 116' and 118' of elevator 22. The elevator is lowered to move the car with its curing charge to lower tracks 120 and 122. The car is then pushed onto the lower tracks and slowly advanced, with several other like cars in various curing stages, to the opposite end of the line. The elevator 22 is then raised again and the next assembled car to be injection molded is advanced into the stationary restraining means. In the meantime cars with fully cured laminates, having reached the opposite end of the conveyor line are hoisted from the lower conveyor tracks to the upper conveyor tracks by elevator 28. It then is shifted into the unloading and reassembly station 30.

At this station tie bolts 50 are removed and the assembly is taken apart to break loose the finished cured sandwich, panel-type unit. The mold is then cleaned a little bit as necessary, is reassembled, and is advanced on down to the stationary restraining means again.

Just after this first car with its mold is removed from the first restraining means, the adjacent car and mold in the adjacent line has reacted sufficiently to be removed from its restraining means. It then goes through the same sequence of events as that just described.

The third car and mold is then treated likewise, and so forth through the plurality of production lines. Consequently, the plurality of cars and molds on each line form a circuit of recirculating cars in various stages of mold preparation, filling, expansion and double restraint, curing, unloading and mold reassembly, while each circuit is sequential to the adjacent one. All, therefore, employ the single mixing and injection head in an extremely efficient manner. This process is shown diagrammatically in FIG. 2, using only one car on each line for purposes of convenience. While car 26a is just leaving zone 20a after being filled and initially reacted, car 26b is being filled by hose 314 in zone 20c. Car 26b with a curing charge is slowly moving along the lower tracks of line 16b to the far elevator 28b, and car 26d is being disassembled at unloading zone 30d for removal of the precured laminate and reassembly of the mold and car.

It has been found that by utilizing this unique apparatus the foamed core units can be economically injection molded by the high pressure method under high production conditions, while still accurately maintaining the dimensional tolerance necessary. This enables, for the first time as far as is known, the economical fabrication of such panels for use in mobile homes, animal housing, prefabricated housing, and many other uses. It should be realized that this high pressure panel achieves remarkable adhesion between the foam and the surrounding layers. It is far less expensive to produce than normal, high density, low pressure foams since the materials cost about 50% less. Also, the structure has excellent characteristics for use as prefabricated paneling merely by bolting it or otherwise locking it in position.

Various additional advantages of the apparatus and concepts set forth herein will occur to those in the art upon studying this foregoing preferred form of the invention. Also, it is conceivable that various minor structural modifications can be made in the particular details of construction specifically taught, while still employing the inventive concepts of the invention. Consequently, this invention is not to be limited merely to the particular structure shown, but only by the scope of the appended claims and the reasonably equivalent structure to those defined therein.

I claim:

1. Injection molding apparatus for high pressure, expandable foaming polymers comprising: a mold defining a mold cavity; inner and outer parts of mold retaining frames on opposite sides of said mold; said inner pair of frames being in contact with said mold and including clamping means restraining said mold from expansion under curing pressures after initial foaming reaction; said outer pair of frames overlapping said inner pair of frames, being in contact therewith and being normally retained thereagainst to prevent expansion of said inner pair and said mold against initial high expansion pressures of the foaming polymer; means to shift said outer pair of frames to an expanded condition for release of said inner pair and said mold; said inner pair and mold being removable from said outer pair for retention of the mold against expansion during curing of the foamed polymer; and said clamping means being releasable to free said mold from said inner pair for removal.

2. Apparatus for injection molding foam core sandwiches comprising: a mold car for foam core sandwiches to be formed; elongated track means operably engaged with and supporting said car for movement of said car therealong, enabling said car to be in different positions during various stages of reaction and curing of the foam core; said car having support means retaining a pair of sheet panels in spaced relationship, and compression retention means holding said panels against expansion upon the injection of pressure foaming material between said panels; said compression retention means being releasable after curing of the foam core in said sandwiches for removal of said sandwich; a shiftable high pressure press adjacent a portion of said track means, including an elevating bed beneath said car and causing elevation of said car above said track means, and an overhead rigid pressure element, and means holding said bed and pressure element in fixed spaced relationship with each other and in contact with the elevated car during injection and initial reaction of the foaming polymer to prevent expansion of said sandwich with generated pressures greater than the retention force of said compression retention means.

3. Apparatus for injection molding foam core sandwiches comprising: a mold car for foam core sandwiches to be formed; elongated conveyor means operably engaged with and supporting said car for movement of said car therealong, enabling said car to be in different positions during various stages of reaction and curing of the foam core; said car having support means retaining a pair of sheet panels in spaced relationship, and compression retention means holding said panels against expansion upon the injection of pressure foaming material between said panels; said compression retention means being releasable after curing of the foam core in said sandwiches for removal of said sandwich; a shiftable high pressure press adjacent a portion of said track means, including a bed beneath said car and an overhead pressure element, and means holding said bed and pressure element in fixed spaced relationship with each other and in contact with the car during injection and initial reaction of the foaming polymer to prevent expansion of said sandwich with generated pressures greater than the retention force of said compression retention means.

4. Molding apparatus for high pressure, expandable, foaming polymers comprising: a forming mold defining a mold cavity; inner and outer pairs of mold retaining frames on opposite sides of said mold; said inner pair of frames being in contact with said mold and including means retaining said mold from expansion under low expansion pressures after initial reaction; said outer pair of frames overlapping said inner pair of frames, being in contact therewith and being normally retained thereagainst to prevent expansion of said inner pair and said mold against initial high expansion pressures of the foaming polymer; means to hold said outer pair in non-expanding engagement with said inner pair, and to shift said outer pair of frames to an expanded condition for release of said inner pair and said mold; conveyor means extending between the members of said outer pair of frames, and beneath said inner pair of frames and the contained mold; said outer pair of frames including a lower member and an upper member, said lower member being shiftable beneath said conveyor means when said outer pair of frames is shifted to said expanded condition to lower said inner pair and mold onto said conveyor means; said inner pair and mold being movable along said conveyor means while retaining said mold during curing of the foamed polymer; and said clamping means being releasable from said mold to release it.

5. Molding apparatus for high pressure, expandable, foaming polymers comprising: a forming mold defining a mold cavity; two stage restraining means for said mold including inner and outer pairs of mold retaining frames on opposite sides of said mold; said inner pair of frames being in contact with said mold and including means clamping said mold against expansion under foam curing pressures; said outer pair of frames overlapping said inner pair of frames, in contact therewith, and normally retained thereagainst to prevent expansion of said inner pair and said mold under high initial foam expansion pressures of the polymer; means to shift said outer pair of frames to an expanded condition for release of said inner pair and said mold; said inner pair of frames including an upper frame and a lower frame, said lower frame including roller elements; said outer pair of frames including an upper member and a lower member; conveyor track means extending between the members of said outer pair of frames and beneath the lower frame of said inner pair; said lower member being movable from a position below said track means when said outer pair is expanded, to allow cooperation of said roller elements on said track means, to a second position above said track means when said outer pair is contracted against said inner pair, to lift said inner pair from said track means, whereby a mold enclosed by said inner pair can be moved between said outer pair for double retention during initial foaming reaction, and removed from said outer pair to be retained by said inner pair during subsequent curing.

6. Injection molding apparatus for high pressure, expandable, foaming polymers comprising: conveyor track means; a plurality of rolling cars on said track means; each of said cars comprising a pair of releasably interconnected upper and lower frame elements straddling a pressure mold; said frame elements having spacer means therebetween to limit compression and connector means to prevent expansion; an initial-reaction, car-retention zone along said track means including a relatively fixed upper jaw above said track means, and a shiftable lower jaw movable from a first position below said track means to a second position above said track means; power means to shift said lower jaw toward and away from said upper jaw; said lower jaw when shifted to its second position being in engagement with a car in said zone to hoist the car from said track means and grip said upper and lower frame elements between said jaws against expansion of said mold during initial high pressure reaction of a foaming polymer in said mold; means limiting the movement of said lower jaw toward said upper jaw; said lower jaw when shifted back to its first position causing lowering of the car onto said track means for removal of the car from said initial reaction retention zone, to allow it to move along said track during curing of the foamed polymer, while still retaining said mold against expansion under curing pressures of said polymer by said frame elements.

7. Production apparatus for high pressure injection molding of expandable foaming polymers comprising: elongated conveyor track means, including an upper track and a lower track, one for handling mold cars containing curing polymer, and the other for returning empty cars; a plurality of mold cars on said tracks; an initial-reaction, pressure-retention zone comprising upper and lower retention jaws vertically astraddle one of said tracks; said jaws being of a size sufficient to entirely receive one of said cars within its confines; said cars being movable between said jaws on said one track; said jaws being shiftable toward each other to grip each car and restrain it against expansion under the high pressure foaming reaction of the polymer and shiftable away from each other to subsequently release the car for removal; shifting means for said jaws; each of said cars including a mold, and pressure retention frame means enveloping said mold for retention thereof against expansion under the effects of internal curing pressures in said mold; a first track-type elevator between said tracks and adjacent said zone, for receiving cars discharged from said retention zone to move them to the curing track; and a second track-type elevator at the opposite end of said track means from said first elevator for moving cars to the return track for disassembly of the retention frame and mold to unload the mold, and reassembly of the mold and retention frame to return the car to said zone.

8. Injection molding apparatus for foaming polymers comprising: a plurality of molds; a plurality of mobile restraining means, one retaining each mold; a stationary restraining means; and conveyor means for moving said mobile restraining means and molds into said stationary restraining means for limited time for initial high-pressure foaming reaction in said molds, and out of said stationary restraining means for curing of the foamed polymer.

(References on following page)

References Cited by the Examiner

UNITED STATES PATENTS

| | | | |
|---|---|---|---|
| 2,383,047 | 8/1945 | Dreyfus | 18—4 |
| 3,036,342 | 5/1962 | Fino | 264—45 |
| 3,075,240 | 1/1963 | Casavina et al. | 264—45 XR |
| 3,080,267 | 3/1963 | Schmalz | 264—45 |
| 3,090,078 | 5/1963 | Ackles | 264—45 |
| 3,124,626 | 3/1964 | Graham et al. | 264—45 |
| 3,161,911 | 12/1964 | Mathews | 18—5 |
| 3,177,271 | 4/1965 | Slayman | 264—45 |
| 3,178,490 | 4/1965 | Petrino | 264—41 |
| 3,182,104 | 5/1965 | Cwik | 264—45 |
| 3,203,042 | 8/1965 | Axelsson | 18—5 XR |
| 3,266,086 | 8/1966 | Markevitch | 18—43 XR |

ALEXANDER H. BRODMERKEL, *Primary Examiner.*

D. J. ARNOLD, *Examiner.*

P. E. ANDERSON, *Assistant Examiner.*